United States Patent [19]

Holopainen

[11] Patent Number: 4,536,976
[45] Date of Patent: Aug. 27, 1985

[54] BRANCH CUTTER MOUNTED ON FRONT LOADER BUCKET

[76] Inventor: Weikko R. Holopainen, Clover Ridge Farm Barre Rd., Hubbardston, Mass. 01452

[21] Appl. No.: 516,108

[22] Filed: Jul. 22, 1983

[51] Int. Cl.³ .............................................. E02F 3/76
[52] U.S. Cl. .................................. 37/117.5; 144/339; 144/34 E; 30/134
[58] Field of Search ...................... 37/117.5, 103, 113, 37/118, DIG. 3, 2 R; 30/124, 134; 144/3 R, 3 C, 3 D, 3 E, 334–339, 343, 34 E

[56] References Cited

U.S. PATENT DOCUMENTS

| | | | |
|---|---|---|---|
| 2,332,561 | 10/1943 | Drott | 37/113 |
| 3,286,377 | 11/1966 | Long | 37/118 |
| 3,471,950 | 10/1969 | Ferwerda | 37/113 |
| 3,482,613 | 1/1968 | Jordan | 144/34 E |
| 3,531,161 | 9/1970 | Conn | 299/18 |
| 3,580,310 | 5/1971 | Frankenberg | 144/34 E |
| 3,581,786 | 6/1971 | Rigoni | 144/3 E X |
| 3,610,301 | 10/1971 | Jordan | 144/339 |
| 3,646,975 | 3/1972 | McNeil, Sr. | 144/339 |
| 3,880,216 | 4/1975 | Anderson et al. | 144/339 |
| 3,913,641 | 10/1975 | White | 144/34 E |
| 4,439,921 | 4/1984 | Ramun et al. | 30/134 |

Primary Examiner—E. H. Eickholt
Attorney, Agent, or Firm—Blodgett & Blodgett

[57] ABSTRACT

Branch cutter for a tractor having a material handling element, such as a bucket. The branch cutter is attached to the bucket and comprises a fixed blade, a movable blade, and a fluid driven actuator operatively connected to the movable blade toward and away from the fixed blade for cutting a branch which is placed between the blades.

8 Claims, 7 Drawing Figures

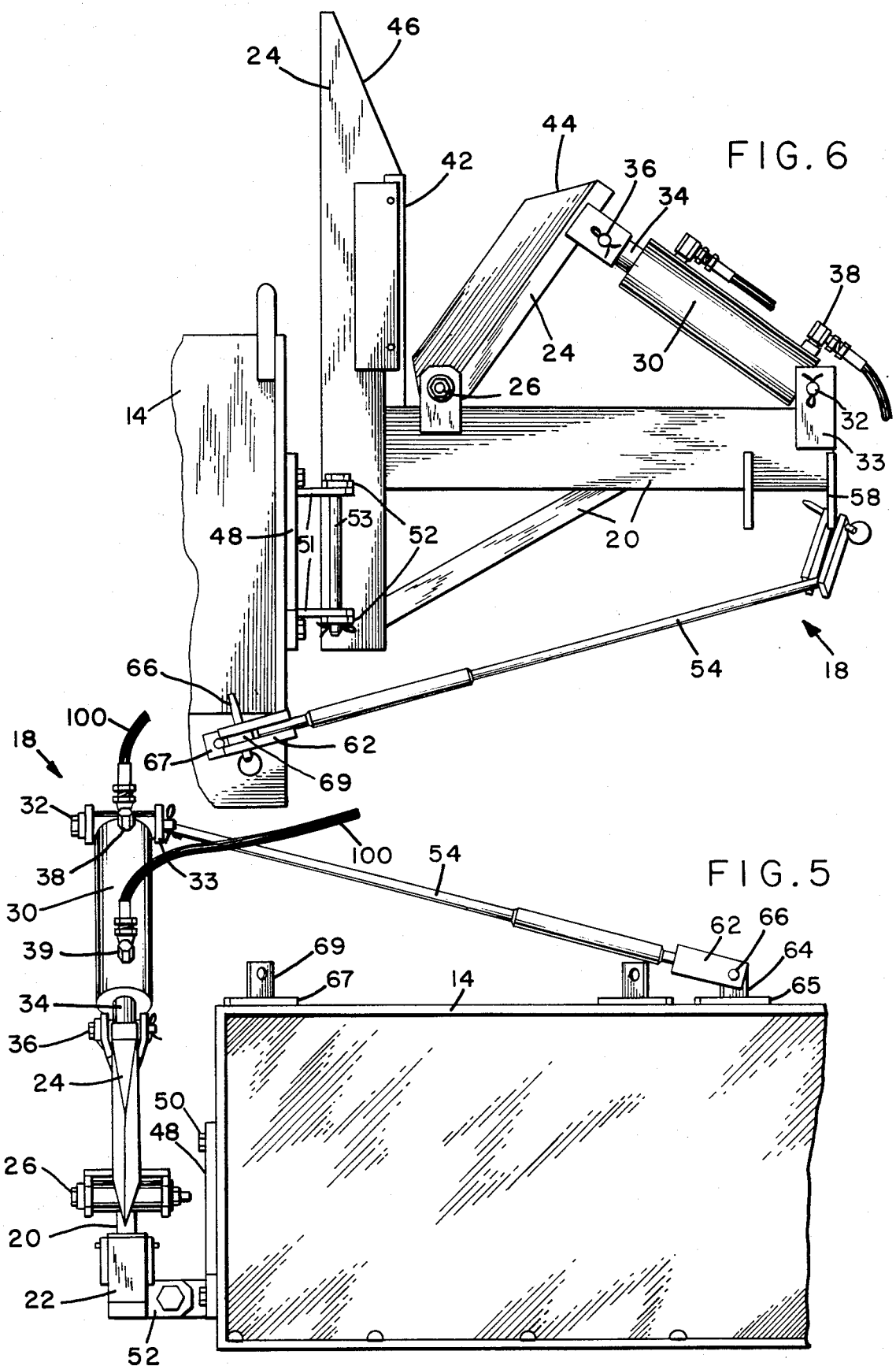

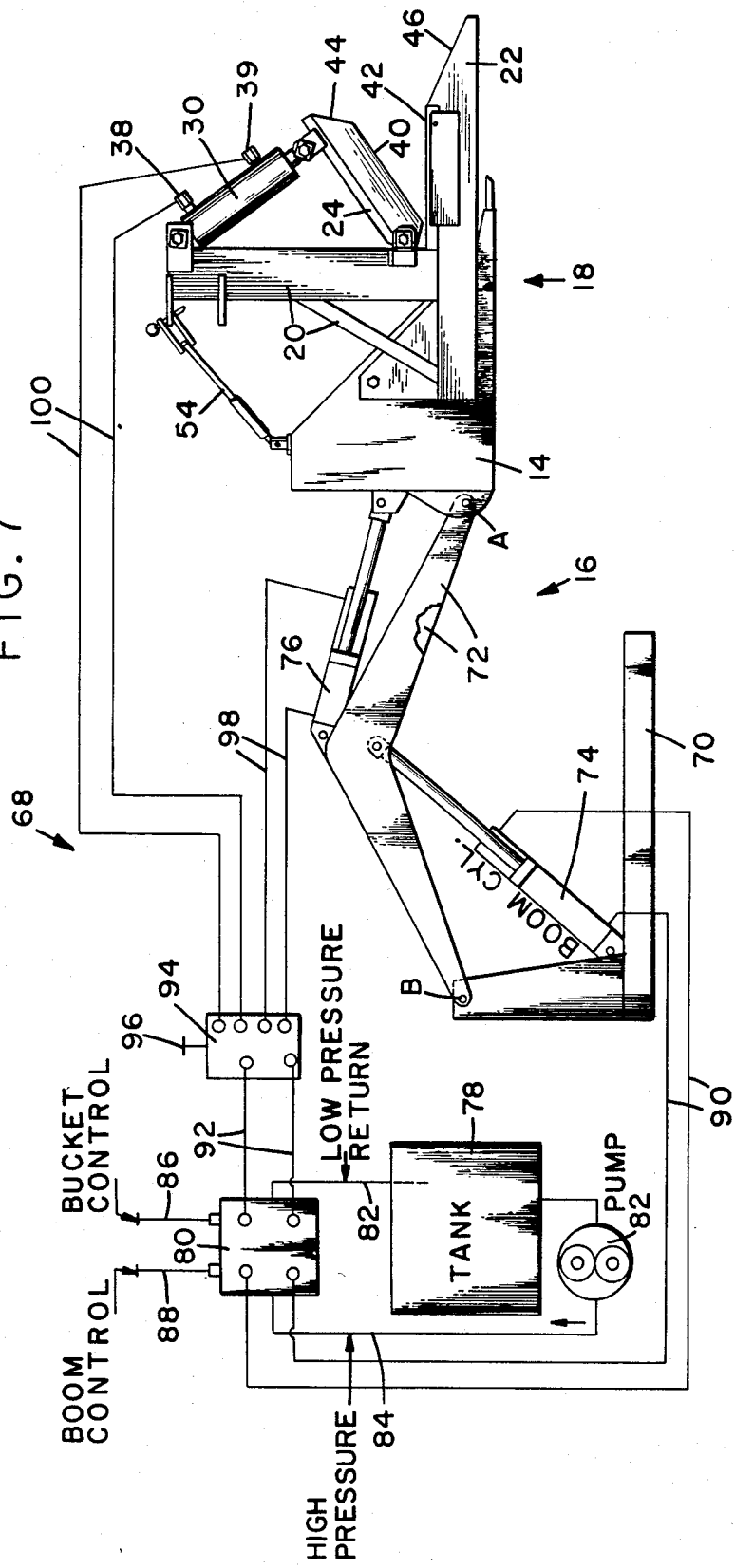

BRANCH CUTTER MOUNTED ON FRONT LOADER BUCKET

BACKGROUND OF THE INVENTION

The present invention is generally directed to a tractor having a branch cutting mechanism, and specifically to a tractor which is provided with a material handling element, such as a scoop, bucket or plow blade, having the cutting mechanism attached thereto. The invention is also specifically directed to a cutting attachment for a tractor having a material handling element.

The use of material handling tractors is very often hindered by the presence of trees, shrubs, or other plant growth. This problem is particularly acute in areas of the country where trees grow readily, such as along the Appalachians and the pacific northwest. In these areas, cutting of trees and other plant growth must precede most operations. These operations include land clearing for farming or other land development, construction, logging, road clearing, etc. Larger trees are felled by the use a chain saw. However, smaller trees and extending branches from trees outside of the designated clearing area must also be cut to create an access for the material handling tractors. All of the wood-cutting operation must precede the use of the material handling tractors and is quite time and labor intensive. The problem is particularly acute if a branch to be cut is quite high or otherwise non-accessible. In these cases, special tree climbing equipment or pruning equipment is required. These and other difficulties experienced with the prior art material handling tractors have been obviated by the present invention.

It is, therefore, an outstanding object of the invention to provide a material handling tractor, having a cutting mechanism which moves with the material handling apparatus, and operates independently of the apparatus.

Another object of the invention is the provision of a material handling tractor, having a cutting mechanism which moves with the material handling apparatus and is adjustable for cutting in a generally vertical plane in and a generally horizontal plane.

A further object of the present invention is the provision of a cutting attachment for a material handling tractor which moves with the material handling apparatus and operates independently of the material handling apparatus.

It is another object of the instant invention to provide a cutting attachment for a material handling tractor which is adjustable for cutting in a generally vertical plane and in a generally horizontal plane.

A still further object of the invention is the provision of a cutting attachment for a material handling tractor which is provided with a hydraulic drive system in which the cutting attachment is operatively-connected to the hydraulic drive system of the tractor.

It is a further object of the invention to provide a cutting attachment for a material handling tractor which includes a hydraulic actuator for moving the material handling element relative to the tractor and control means for the hydraulic actuator, wherein the control means can be used for selectively actuating the material handling apparatus and the cutting mechanism.

It is a further object of the invention to provide a cutting attachment for a material handling tractor which has the capability of compensating for slight misalignment between the cutting blades of the cutting attachment and the element to be cut.

With these and other objects in view, as will be apparent to those skilled in the art, the invention resides in the combination of parts set forth in the specification and covered by the claims appended hereto.

SUMMARY OF THE INVENTION

In general, the invention consists of a tractor having a motor driven vehicle, material handling apparatus mounted on the vehicle, drive means for the material handling apparatus, a fixed cutting blade, a movable cutting blade for cooperating with the fixed cutting blade, means for attaching the fixed and movable cutting blades to the material handling apparatus and a fluid-driven actuator operatively-connected to the movable blade for actuating the movable blade toward and away from the fixed blade independently of the drive means for the material handling apparatus. The invention also comprises a cutting attachment for a tractor having a material handling element in which the cutting attachment comprises a fixed blade and a movable blade mounted on the material handling element for movement therewith and a fluid-driven actuator for moving the movable blade relative to the fixed blade.

BRIEF DESCRIPTION OF THE DRAWINGS

The character of the invention, however, may be best understood by reference to one of its structural forms, as illustrated by the accompanying drawings, in which:

FIG. 5 is a front elevational view of the cutting attachment, FIG. 6 is a plan view of the cutting attachment shown in an alternate cutting position, and FIG. 7 is a schematic view of a hydraulic drive system for the tractor, including the cutting mechanism.

DESCRIPTION OF THE PREFERRED EMBODIMENT

Figure 1:
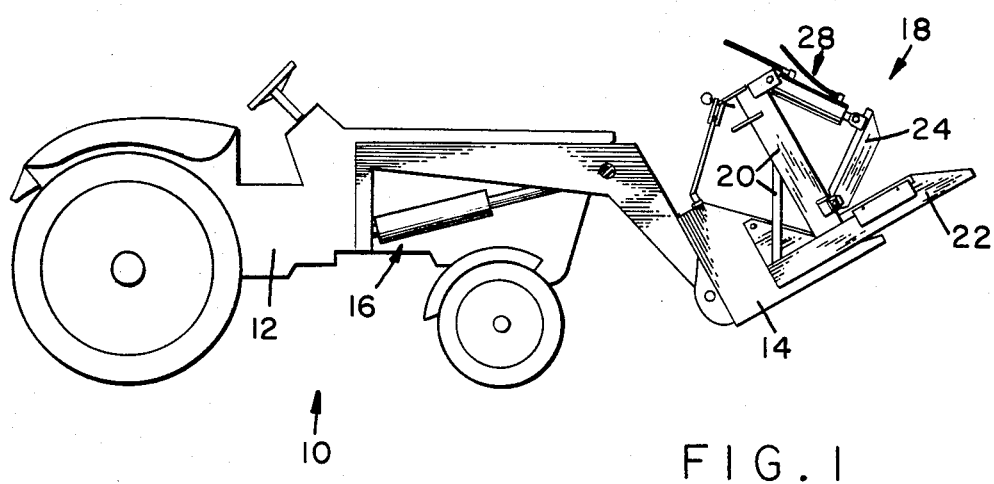
FIG. 1 is a side elevational view of a tractor embodying the principles of the present invention.
Figure 2:
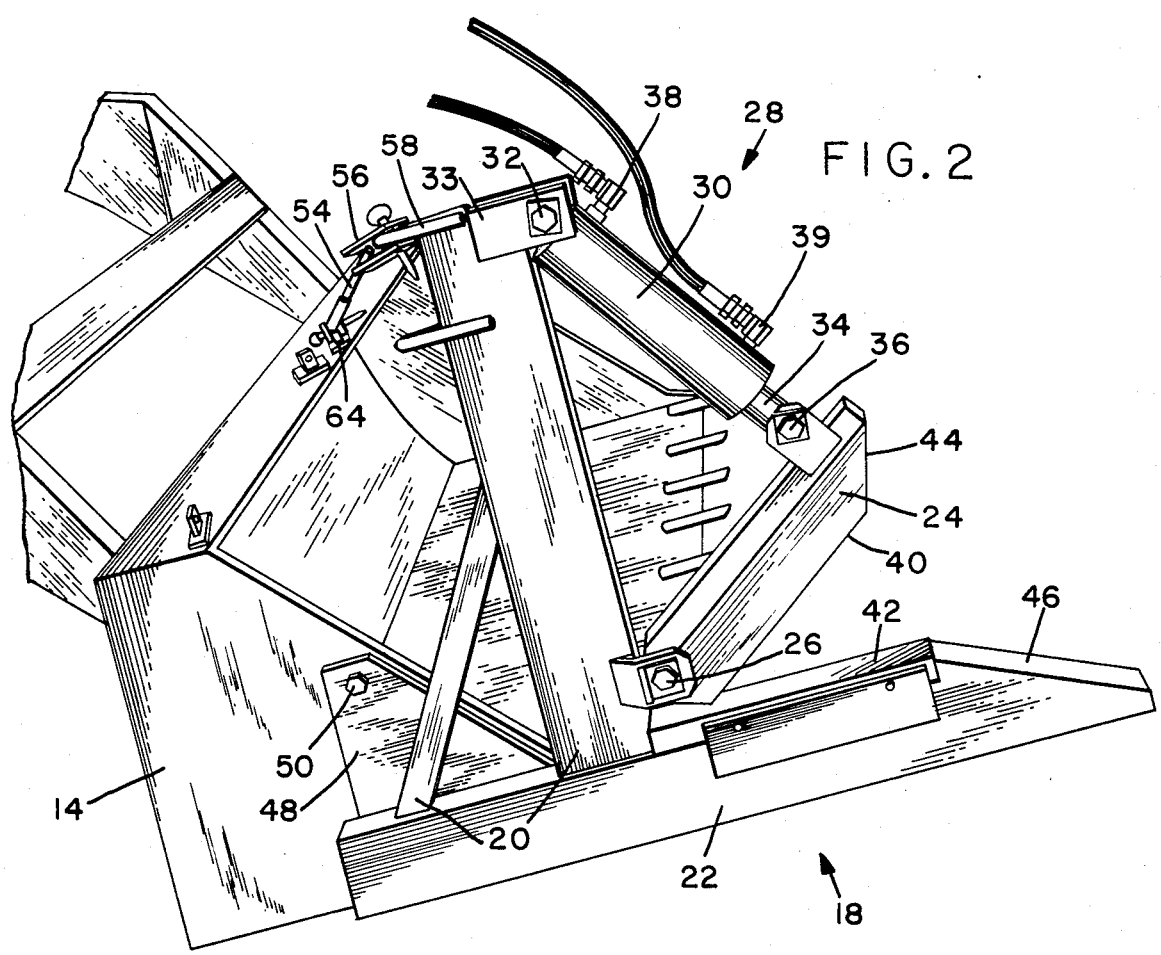
FIG. 2 is a fragmentary perspective view of the front end of the tractor showing the cutting attachment of the present invention.
Figure 3:
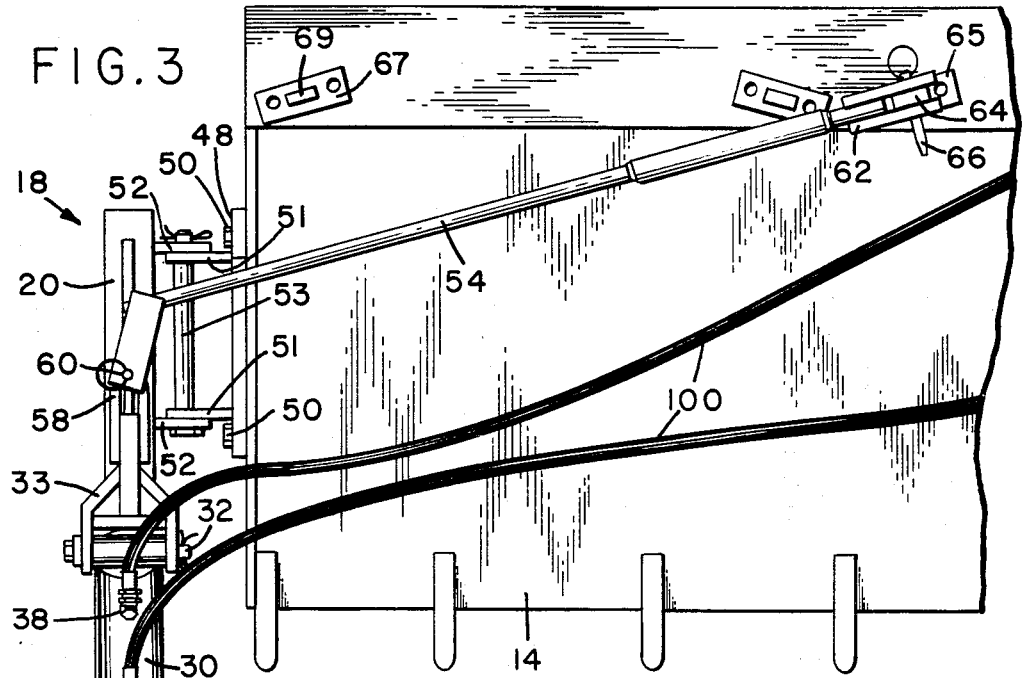
FIG. 3 is a plan view of the cutting attachment as applied to the front end loader bucket of a tractor.

Referring first to FIGS. 1 and 2 which best show the general features of the invention, the tractor is generally indicated by the reference numeral 10 and includes a motor driven vehicle 12 provided with material handling apparatus, such as a bucket 14, a hydraulic drive means for the bucket generally indicated by the reference numeral 16, and a branch cutting mechanism generally indicated by the reference numeral 18. The tractor 10 which is illustrated in FIG. 1 is a garden tractor, having a front end bucket. The term tractor is used in this application as meaning any farming or construction-type vehicle provided with material handling apparatus, such as a farm tractor, front end loader, back hoe, etc. The tractor 10 may include as part of its original equipment, the cutting mechanism 18. However, the invention also includes a cutting attachment that can be readily applied to a tractor-like vehicle, such as the garden tractor illustrated in FIG. 1. The cutting mechanism 18 which is illustrated in the drawings is an attachment which is particularly adapted for mounting to the bucket of a tractor or a front end loader.

Referring to FIGS. 1-5, the branch cutting mechanism 18 comprises a frame 20, a fixed cutting blade 22 which is rigidly attached to the frame 20, and a movable cutting blade 24 which is pivotally-connected to the frame 20 by means of a pin 26. The movable cutting blade 24 is actuated by means of a hydraulic actuator, generally indicated by the reference numeral 28. The hydraulic actuator 28 comprising a cylinder 30 which is pivotally-connected by means of a pin 32 to a U-shaped bracket 33 which forms part of the frame 20. A piston 34 is slidably mounted within the cylinder 38 and is pivotally-connected to the front end of the movable blade 24 by means of a pivot pin 36. A pair of hydraulic fixtures 38 and 39 are located at opposite ends of the cylinder 30. The lower end of the movable cutting blade 24 is provided with a sharp edge 40. The fixed or stationary cutting blade 22 is provided with a flat upper cutting surface 42 which is made of a material which is substantially softer than the cutting edge 40 of the movable cutting blade. The hydraulic actuator 28 is effective to move the movable cutting blade 24 from the open position shown in full lines in FIG. 4 to the closed position shown in dotted lines in which the cutting edge 40 rests against the surface 42. The forward portion of the movable cutting blade 24 has a beveled edge surface 44 and the forward portion of the stationary cutting blade 22 has a beveled surface 46. The beveled surfaces 44 and 46 form a V-shaped opening for receiving a branch to be cut.

Figure 4:
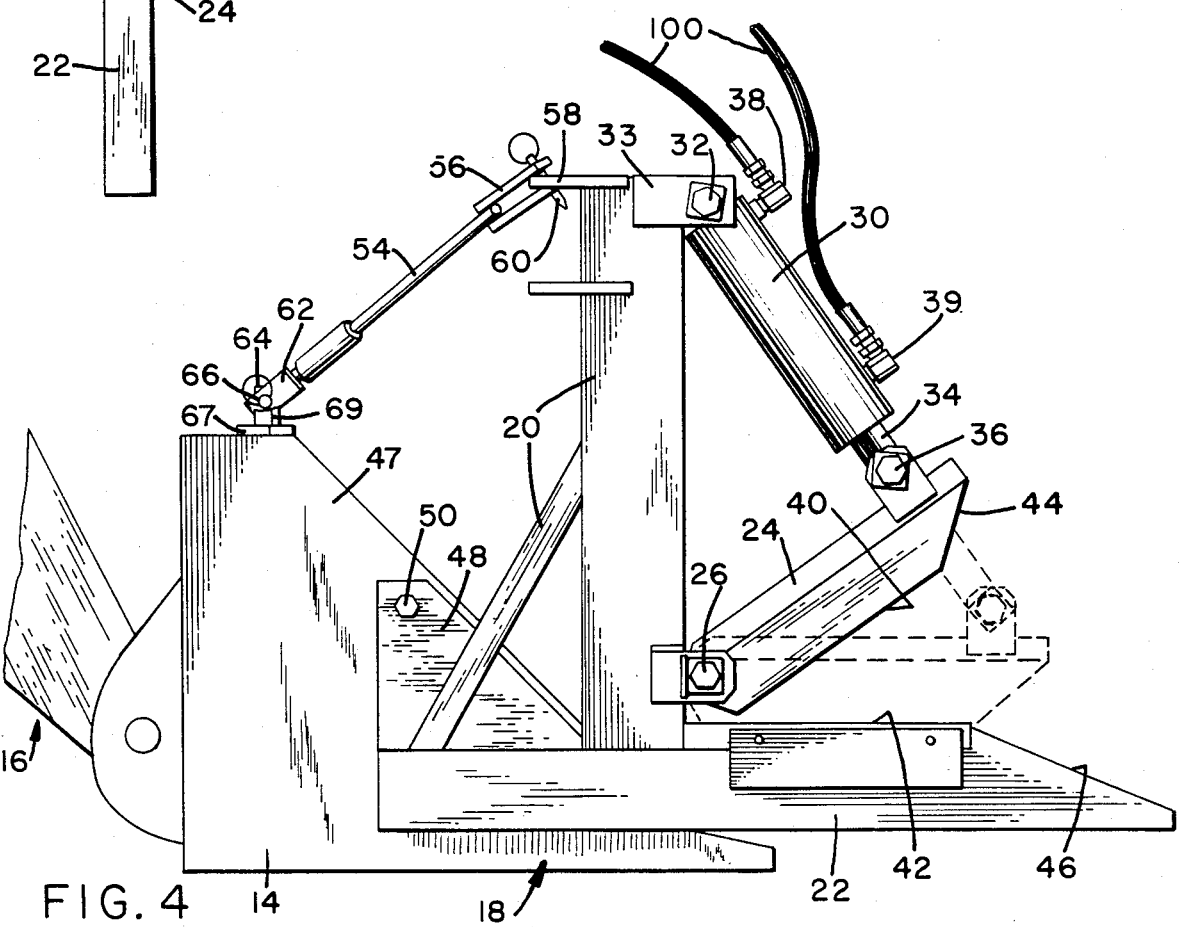
FIG. 4 is a side elevational view of the cutting attachment.

The cutting mechanism 18 is applied to the bucket 14 by means of a flat plate 48 which is attached to one of the side walls 47 of the bucket by means of a plurality of bolts 50. The frame 20 is provided with a pair of transverse flanges 51 which are adapted to overlie a pair of flanges 52 which project from the plate 48. A stub shaft 53 extends through the flanges 51 and 52 to form a hinged connection between the frame 20 and the plate 48, (see particularly FIG. 3). This hinged connection enables the cutting mechanism 18 to assume a first or upright cutting position as shown in FIG. 4 to a second or prone cutting position as shown in FIG. 6.

When the cutting mechanism 18 is in the upright cutting position shown in FIGS. 1-5, the movement of the movable cutting blade 24 is always in a vertical plane and parallel with the vertical moving plane of the bucket 14. When the cutting mechanism 18 is in the prone position shown in FIG. 6, the movable blade 24 moves in a plane which is transverse to the moving plane of the bucket. When the cutting mechanism 18 is in this position, cutting is done primarily in a horizontal plane, depending on the position of the bucket 14.

The cutting mechanism 18 is maintained in the upright position or the prone position by means of a stabilizing bar 54 which extends from the bucket 14 to the frame 20. The opposite ends 56 and 62 of the stabilizing bar 54 are bifurcated as shown more clearly in FIGS. 4 and 3. The end 56 straddles a loop 58 which forms part of the frame 20 and is pivotally-connected thereto by means of a snap pin 60. The end 62 straddles a vertically-extending flange 64 of a bracket 65 which is mounted at the top of the bucket 14. The end 62 is pivotally-connected to the flange 64 by means of a snap pin 66. The opening of the loop 58 is substantially larger than the pin 60, so that the connection between the end 56 and the loop 58 is relatively loose to allow for slight misalignments between the cutting blades 22 and 24 and a tree branch to be cut.

The hydraulic drive means 16 for the bucket 14 and the branch cutting mechanism 18 is schematically shown in FIG. 7 and includes hydraulic circuitry, generally indicated by the reference numeral 68. As shown in FIG. 7, the bucket 14 is supported by a boom or a pair of levers 72, each of which is operatively-connected to a boom cylinder 74. Each lever 72 is pivotally-connected at one end to the bucket 14 at point A. Each lever 72 is also pivotally-connected at it's opposite end at point B to the frame 70 of the tractor. Actuation of the boom cylinders 74 causes the levers 72 to rotate the bucket 14 about the point B within a vertical plane. A pair of bucket cylinders 76 are operatively-connected to the levers 72 and to the bucket 14, so that actuation of the cylinders 76 causes the bucket 14 to rotate about the point A in the same vertical plane which is defined by the movement of the bucket about point B.

The hydraulic circuitry 68 as shown in FIG. 7, includes a tank 78 containing hydraulic fluid, a control valve 80 and a pump 82 which is operatively-connected between the tank 78 and the control valve 80 through a high pressure line 84. A low pressure return line 82 connects the control valve 82 to the tank 78. The control valve 80 is connected to each of the boom cylinders 74 by a pair of hydraulic lines 90. Actuation of the boom cylinders 74 is controlled by a boom control lever 88 which forms part of the control valve 80. The control valve 80 is also provided with a bucket control lever 86 and is normally connected to the bucket cylinders 76 by pairs of hydraulic lines 92. However, when the branch cutting mechanism 18 is attached to the bucket 14, the hydraulic lines 92 are connected to a selector valve 94. The selector valve 94 is, in turn, connected to the bucket cylinder 76 by a pair of hydraulic lines 98 and to the cylinder 30 by a pair of hydraulic lines 100. The selector valve 94 is a 6 port double selector valve manufactured by Metro Hydraulic of Minneapolis, Minn. and is provided with a selector button 96 for selectively actuating the cylinder 76 or the cylinder 30. When the button 96 is in the out position as shown in FIG. 7, the hydraulic lines 98 are operatively-connected to the hydraulic lines 92, so that operation of the bucket control lever 86 is effective to actuate the bucket 14 to the cylinder 76. When the button 96 is pushed into the inner position, it is effective to render the selector valve 94 to it's second operating state in which the hydraulic lines 100 are operatively-connected to the hydraulic lines 92. When the selector valve 94 is in the second state, the bucket control lever 86 is effective to actuate the branch cutting mechanism 18.

The operation and advantages of the present invention will now be readily understood in view of the above description. At the beginning of a cutting operation, the branch cutting mechanism is positioned in either the upright position as shown in FIGS. 1-5 or in the prone position as shown in FIG. 6. If the branches to be cut extend primarily horizontally, the upright position of the branch cutting mechanism 18 is chosen. The cutting mechanism is maintained in this position by attaching the stabilizing bar 54 to the bracket 65. If the branches to be cut extend generally vertically or if saplings have to be cut, the branch cutting mechanism 18 is set into the prone position as shown in FIG. 6. The branch cutting mechanism 18 is maintained in this prone position by connecting the stabilizing bar 54 to the bracket 67, as shown in FIG. 6.

Assuming that the branch cutting mechanism 18 is in the upright position, the tractor is driven to the tree or branches to be cut. Initially, the selector valve 94 is in it's first setting with the button 96 in the out position, so that the bucket control lever 86 is effective to control the bucket cylinder 76. By operating the control levers 86 and 88, the cylinders 74 and 76 are actuated to move the bucket 14, so that the branch cutting apparatus 18 is maneuvered into a cutting position relative to the branch to be cut. In this position, the movable cutting blade 24 is in the open position as shown in full lines in FIG. 4, so that an opening is formed between the cutting blades 24 and 22 for receiving the branch. When the branch cutting apparatus is properly positioned, the button 96 is pushed in so that the selector valve 94 in it's second setting. This activates the cylinder 30 so that by moving the control lever 86, the operator can actuate the cylinder 30, so that the movable blade 24 is moved to the closed position relative to the fixed blade 22 as shown in dotted lines in FIG. 4, thus effectively cutting the branch which is positioned between the cutting blades.

When generally vertically extending branches or saplings are to be cut, the branch cutting apparatus is adjusted to the prone position shown in FIG. 6. This is accomplished by removing the snap pin 66 and positioning the bifurcated end 62 of the stabilizing bar 54, so that it straddles the flange 69 of the bracket 67. The pin 66 is then reinserted through the end 62 and through the flange 69 to maintain the branch cutting apparatus in the prone position shown in FIG. 6. The operator then operates the hydraulic controls in the same manner as described above to position the bucket and the branch cutting mechanism 18 for cutting vertically extending branches and saplings.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Branch cutter for a tractor having a material handling element which is movable independently of the tractor, said branch cutter comprising:
   (a) a frame,
   (b) a fixed blade fixed to the frame,
   (c) a movable blade which is pivotally mounted on the frame for movement between an open position in which the movable blade is spaced from the fixed blade to a closed position in which the movable blade cooperated with the fixed blade for cutting a branch which is positioned between the blades,
   (d) a fluid driven actuator which is operatively connected to the frame and the movable blade for moving the movable blade between said open position and closed position,
   (e) a bracket which is adapted to be attached to the material handling element of the tractor,
   (f) means for for pivotally connecting the frame of the branch cutter to the bracket so that the frame can swing from a first position in which the movable blade moves in a vertical plane which is parallel with the moving plane of the material handling element of the tractor to a second position in which the movable blade moves in a plane which is perpendicular to the moving plane of said material handling element, and
   (g) an adjustable stabilizing rod which is operatively connected to the said material handling element and the frame of the branch cutter for locking the branch cutter in either of said first and second positions.

2. Branch cutter as recited in claim 1, wherein one end of said stabilizing rod is pivotally connected to said frame and the opposite end of said stabilizing rod is pivotally connected to said material handling element.

3. Branch cutter as recited in claim 2, wherein one of the pivotal connections of said stabilizing rod is relatively loose to allow for slight misalignment between said blades and a branch to be cut.

4. Branch cutter as recited in claim 2, wherein the stabilizing rod is attachable to said material handling element at a first point for said first position and at a second point for said second position.

5. Branch cutter as recited in claim 2, wherein the stabilizing rod is attachable to said frame at at least two different points.

6. Branch cutter as recited in claim 1, wherein said fixed blade comprises a flat surface which is at a right angle to the moving plane of said movable blade and said movable blade has a sharp cutting edge facing said flat surface.

7. Branch cutter as recited in claim 6, wherein said flat surface is made of a material which is substantially softer than said cutting edge.

8. Tractor comprising:
   (a) a motor driven vehicle,
   (b) material handling apparatus mounted on the vehicle for movement relative to the vehicle,
   (c) drive means for actuating the material handling apparatus,
   (d) a fixed cutting blade,
   (e) a movable cutting blade operatively connected to the material handling apparatus for pivoting motion between an open position in which the movable blade is spaced from the fixed blade to a closed position in which the movable blade cooperates with the fixed blade for cutting an appropriate object which is positioned between the blades,
   (f) a fluid driven actuator operatively connected to the movable blade for moving the movable blade between said open and closed positions independently of the drive means for the material handling apparatus,
   (g) a bracket which is adapted to be attached to the material handling element of the tractor,
   (h) means for pivotally connecting the frame of the branch cutter to the bracket so that the frame can swing from a first position in which the movable blade moves in a vertical plane which is parallel with the moving plane of the material handling element of the tractor to a second position in which the movable blade moves in a plane which is perpendicular to the moving plane of said material element, and
   (i) an adjustable stabilizing rod which is operatively connected to the said material handling element and the frame of the branch cutter for locking the branch cutter in either of said first and second positions.

* * * * *